United States Patent
Tsuruta et al.

(10) Patent No.: US 8,985,691 B2
(45) Date of Patent: Mar. 24, 2015

(54) VEHICLE SEAT

(71) Applicant: Toyota Boshoku Kabushiki Kaisha, Aichi-ken (JP)

(72) Inventors: Mari Tsuruta, Aichi-ken (JP); Yoshiyuki Kumazaki, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 6 days.

(21) Appl. No.: 13/912,536

(22) Filed: Jun. 7, 2013

(65) Prior Publication Data
US 2013/0341985 A1 Dec. 26, 2013

(30) Foreign Application Priority Data
Jun. 26, 2012 (JP) ................................ 2012-142861

(51) Int. Cl.
| | |
|---|---|
| B60N 2/06 | (2006.01) |
| B60N 2/20 | (2006.01) |
| B60N 2/30 | (2006.01) |
| B60N 2/12 | (2006.01) |
| B60N 2/235 | (2006.01) |

(52) U.S. Cl.
CPC B60N 2/20 (2013.01); B60N 2/065 (2013.01); B60N 2/12 (2013.01); B60N 2/2356 (2013.01)
USPC .................. 297/378.12; 297/378.14; 297/331

(58) Field of Classification Search
USPC ................................ 297/378.12, 378.14, 331
See application file for complete search history.

(56) References Cited

U.S. PATENT DOCUMENTS

| | | | | |
|---|---|---|---|---|
| 6,464,299 | B1 * | 10/2002 | Castagna ................. | 297/378.12 |
| 6,805,410 | B2 * | 10/2004 | Christoffel et al. ...... | 297/378.12 |
| 7,066,543 | B2 * | 6/2006 | Yu ............................ | 297/378.12 |
| 7,097,252 | B2 * | 8/2006 | Becker et al. ............ | 297/378.12 |
| 7,156,463 | B2 * | 1/2007 | Taubmann et al. ....... | 297/378.12 |
| 7,357,455 | B2 * | 4/2008 | Becker et al. ............ | 297/378.12 |
| 7,434,885 | B2 * | 10/2008 | Becker et al. ............ | 297/378.12 |
| 7,578,556 | B2 * | 8/2009 | Ohba et al. ........... | 297/378.12 X |
| 7,775,594 | B2 * | 8/2010 | Bruck et al. .......... | 297/378.12 X |
| 7,837,268 | B2 * | 11/2010 | Becker et al. ............ | 297/378.12 |
| 7,871,128 | B2 * | 1/2011 | Bonk et al. ............... | 297/378.12 |
| 7,971,938 | B2 * | 7/2011 | Wieclawski ............. | 297/378.12 |
| 8,002,355 | B2 * | 8/2011 | Kumazaki et al. ....... | 297/378.12 |
| 8,141,954 | B2 * | 3/2012 | Kumazaki et al. ... | 297/378.12 X |
| 8,439,444 | B2 * | 5/2013 | Ngiau ....................... | 297/378.12 |
| 8,662,578 | B2 * | 3/2014 | Szybisty et al. ..... | 297/378.12 X |
| 8,684,463 | B2 * | 4/2014 | Rumler ................ | 297/378.12 X |

(Continued)

FOREIGN PATENT DOCUMENTS

| | | |
|---|---|---|
| JP | 2006-219040 | 8/2006 |
| JP | 2008-239075 | 10/2008 |

(Continued)

*Primary Examiner* — Rodney B White
(74) *Attorney, Agent, or Firm* — Greenblum & Bernstein, P.L.C.

(57) ABSTRACT

A vehicle seat includes an operating link rotatably mounted to a base, a bracket that is provided on a seat back, and is arranged to be pressed against the operating link due to rotation of the seat back, so as to push and rotate the operating link, and an operating mechanism arranged to be operated by the operating link when the operating link is pushed and rotated. The bracket and the operating link are engaged with each other such that one of the bracket and the operating link sandwiches the other of the bracket and the operating link in rotational directions thereof, so that the above-indicated one of the bracket and the operating link abuts on the other thereof in both of the rotational directions.

5 Claims, 12 Drawing Sheets

(56) References Cited

U.S. PATENT DOCUMENTS

2003/0127898 A1* 7/2003 Niimi et al. .......... 297/378.12 X
2009/0315378 A1* 12/2009 Kumazaki et al. ............ 297/341

FOREIGN PATENT DOCUMENTS

| JP | 2010-221935 | 10/2010 |
| JP | 2011-116303 | 6/2011 |

* cited by examiner

VEHICLE SEAT

INCORPORATION BY REFERENCE

The disclosure of Japanese Patent Application No. 2012-142861 filed on Jun. 26, 2012 including the specification, drawings and abstract is incorporated herein by reference in its entirety.

BACKGROUND OF THE INVENTION

1. Field of the Invention

The invention relates to a vehicle seat. More specifically, the invention is concerned with a vehicle seat provided in a condition in which a seat back is pivotally mounted to a base on a floor, such that the seat back can be inhibited from rotating.

2. Description of Related Art

A vehicle seat provided with a link mechanism that transmits movement of a seat back when it is tilted forward, to another operating mechanism, is known (see Japanese Patent Application Publication No. 2006-219040 (JP 2006-219040 A)). The link mechanism includes an operating link that is pushed and rotated due to movement of the seat back when it is tilted forward, and a cable connected to the operating link is pulled depending on the amount of movement of the operating link when it is pushed and rotated, so that the amount of movement of the operating link is transmitted to another operating mechanism.

In the vehicle seat constructed as described above, when the seat back is raised up to the standing position, the operating link that was pushed and rotated due to forward tilting of the seat back is returned to the initial position, using bias force of a spring. This arrangement may require an increased number of components. Also, the returning operation may not be appropriately performed when some force that exceeds the bias force of the spring causes the operating link to be stuck during the returning operation.

SUMMARY OF THE INVENTION

The invention provides a vehicle seat including an operating link that transmits rotating movement of a seat back, wherein the operating link is appropriately moved in accordance with the rotating movement of the seat back in both directions, without increasing the number of components.

A vehicle seat according to an aspect of the invention is provided in a condition in which a seat back is pivotally mounted to a base on a floor, such that the seat back can be inhibited from rotating. The vehicle seat includes an operating link rotatably mounted to the base, a bracket that is provided on the seat back, and is arranged to be pressed against the operating link due to rotation of the seat back, so as to push and rotate the operating link, and an operating mechanism arranged to be operated by the operating link when the operating link is pushed and rotated. In the vehicle seat, the bracket and the operating link are engaged with each other such that one of the bracket and the operating link sandwiches the other of the bracket and the operating link in rotational directions thereof, so that the above-indicated one of the bracket and the operating link abuts on the other of the bracket and the operating link in both of the rotational directions.

The bracket and the operating link are engaged with each other such that one of the bracket and the operating link sandwiches the other of the bracket and the operating link in rotational directions thereof, so that the above-indicated one of the bracket and the operating link abuts on the other thereof in both of the rotational directions. With this arrangement, the operating link is rotated in accordance with rotating or tilting movement of the seat back. Since one of the bracket and the operating link abuts on the other thereof in both rotational directions, the operating link that transmits rotating movement of the seat back can be appropriately moved in accordance with the rotating movement of the seat back in both directions without increasing the number of components.

In the vehicle seat according to the above aspect of the invention, the operating mechanism may be normally held in an initial position due to spring force, before the operating mechanism is pushed and rotated by the operating link, and may be arranged to be pushed and rotated by the operating link against the spring force, so as to be held in an operated condition in which the operating mechanism rides on an outer circumferential surface of the operating link.

With the above arrangement, in the condition where the operating mechanism rides on the outer circumferential surface of the operating link, pressing force derived from the spring force is applied from the operating mechanism onto the outer circumferential surface of the operating link, thus making it less easy to rotate the operating link. However, the operating link, which is arranged to abut on the bracket in both rotational directions, is appropriately rotated in association with the rotating movement of the seat back.

In the vehicle seat as described above, the operating mechanism may have an output link rotatably mounted to the base via a support shaft, an intermediate link rotatably mounted to the output link via a coupling shaft, a pressing spring that urges the intermediate link to rotate in such a direction as to press the intermediate link against the support shaft, and a holding spring that holds the output link in a condition in which the output link is at an initial position before operation thereof. The intermediate link may be normally held in a condition in which the intermediate link is pressed against the support shaft due to spring force of the pressing spring, and the intermediate link may be arranged to be pushed and rotated in such a direction as to be pressed against the support shaft when the operating link is pushed and rotated, so that the intermediate link is rotated about the support shaft, integrally with the output link coupled to the intermediate link via the coupling shaft. When the operating link is rotated in a reverse direction from a condition in which the operating link rotates beyond a region in which the operating link pushes and rotates the inter mediate link and a positional relationship between the operating link and the intermediate link is reversed, the intermediate link may be pushed and rotated alone about the coupling shaft, against spring force of the pressing spring, so as to interrupt power transmission from the operating link by free rotation, thereby to inhibit the output link from rotating.

With the above arrangement in which the intermediate link interrupts rotating operation received from the operating link in the reverse direction, by free rotation thereof, resistive force due to spring force of the pressing spring is applied to the operating link, during free rotation of the intermediately link, thus making it less easy to rotate the operating link. However, since the operating link is arranged to abut on the bracket in both rotational directions, the operating link is appropriately rotated in accordance with the rotating movement of the seat back.

In each of the above arrangements, the base may be a seat cushion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
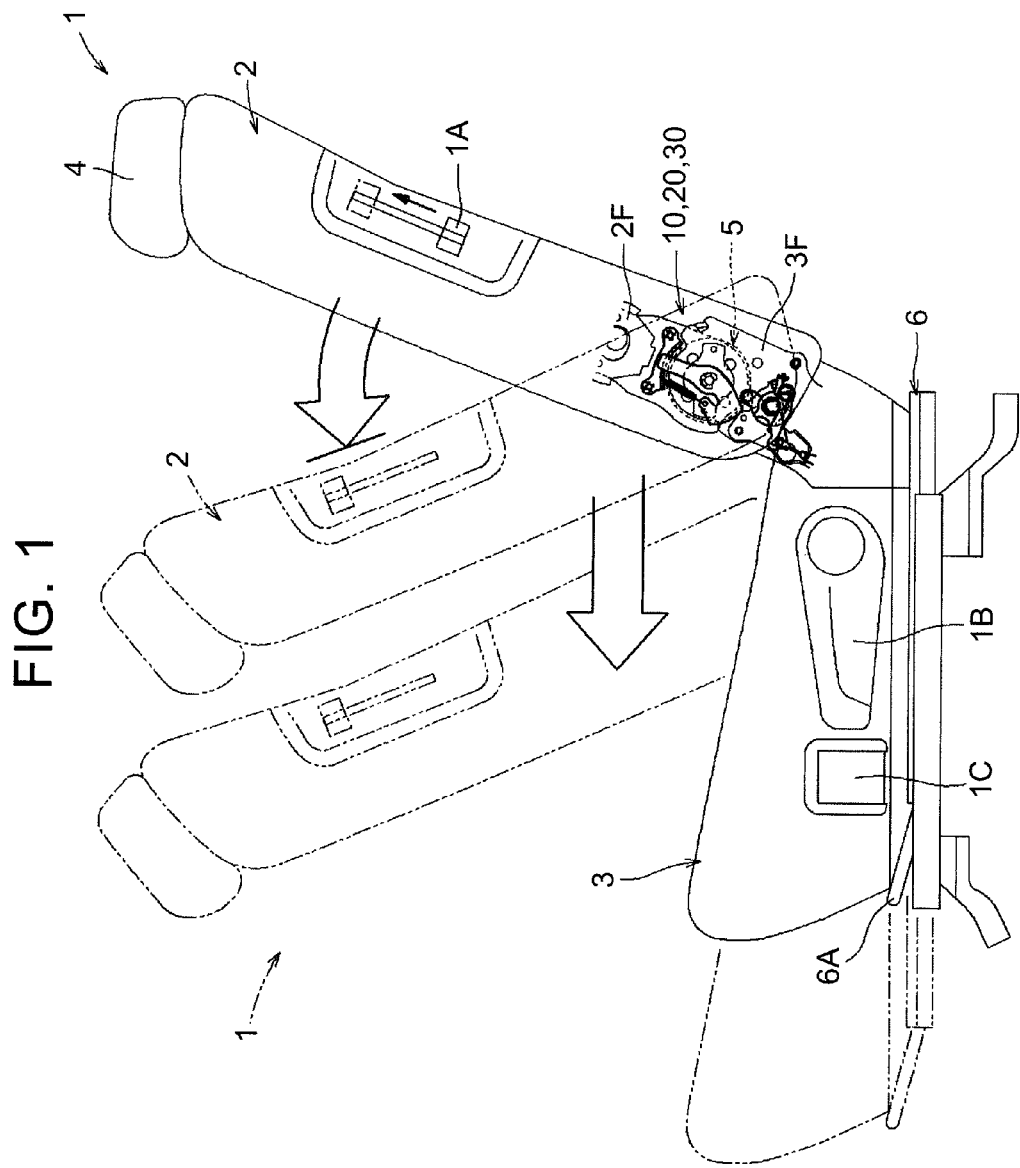
FIG. 1 is a side view schematically illustrating a walk-in operation of a vehicle seat according to a first embodiment of the invention.

Some embodiments of the invention will be described with reference to the drawings.

Initially, the construction of a vehicle seat 1 according to a first embodiment of the invention will be described with reference to FIG. 1 through FIG. 11. The vehicle seat 1 of this embodiment is constructed as a second-row seat located behind a driver's seat of a vehicle (automobile) having three rows of seats, as shown in FIG. 3. The vehicle seat 1 has a seat back 2 that serves as a backrest for a seated passenger, a seat cushion 3 as a seating portion, and a headrest 4. Lower end portions of the right and left sides of the seat back 2 are respectively coupled with rear end portions of the right and left sides of the seat cushion 3, via disc-shaped reclining devices 5 interposed therebetween. The reclining device 5 functions as a pivotal device capable of inhibiting rotation of the seat back 2 relative to the seat cushion 3. Thus, the seat back 2 is coupled with the seat cushion 3, such that the angle of the backrest as measured in the front-back direction of the seat can be adjusted as desired. Here, the seat cushion 3 corresponds to the "base" of the invention.

Each of the reclining devices 5 as described above is normally held in a locked condition in which the backrest angle of the seat back 2 is fixed. When the user pulls up a W/I lever 1A provided at an outer side portion of the seat back 2 as viewed in the vehicle width direction, or pulls up a cushion lever 1B provided at an outer side portion of the seat cushion 3 as viewed in the vehicle width direction, the reclining devices 5 are released from the locked conditions at the same time. With the releasing operation thus performed, the seat back 2 is placed in a condition where the seat back 2 is allowed to be freely rotated in the front-back direction of the seat so that the backrest angle can be adjusted.

If the W/I lever 1A or cushion lever 1B stops being operated after the backrest angle of the seat back 2 is adjusted to a desired angle, the reclining devices 5 are returned to the locked conditions, and the seat back 2 is fixed in the position of the adjusted backrest angle. The basic structure of the reclining device 5 is a known structure as disclosed in Japanese Patent Application Publication No. 2011-116303 (JP 2011-116303 A), and thus will not be specifically described herein.

The seat cushion 3 is mounted on the floor of the vehicle with a pair of right and left slide devices 6 interposed therebetween. With this arrangement, the mounting position of the seat cushion 3 as viewed in the seat front-back direction, relative to the floor, can be adjusted. Each of the slide devices 6 is normally held in a locked condition in which the mounting position of the seat cushion 3 is fixed, by means of a biasing structure of a spring member (not shown) provided within the slide device 6. When the user pulls up a release lever 6A that extends from the slide devices 6 to a front lower portion of the seat cushion 3, the slide devices 6 are released from the locked conditions at the same time. With the releasing operation thus performed, the seat cushion 3 is placed in a condition in which the seat cushion 3 is allowed to freely slide in the seat front-back direction, so that its mounting position can be adjusted.

If the release lever 6A stops being operated after the mounting position of the seat cushion 3 is adjusted to a desired slide position, the slide devices 6 are returned to the locked conditions, and the seat cushion 3 is fixed in the adjusted slide position. The basic structure of the slide device 6 is substantially identical with that as disclosed in Japanese Patent Application Publication No. 2010-221935 (JP 2010-221935 A), and thus will not be specifically described herein.

The headrest 4 is mounted from the upper side onto a top portion of the seat back 2. More specifically, two rod-like stays (not shown) that protrude from the bottom of the headrest 4 are respectively inserted, from the upper side, into two cylindrical support members fixed on an upper frame 2FA of a seat-back frame 2F (which will be described later in FIG. 5), so that the headrest 4 is fixedly mounted in the top portion of the seat back 2. The mounting structure of the headrest 4 as described above is substantially identical with that as disclosed in Japanese Patent Application Publication No. 2008-239075 (JP 2008-239075 A), and thus will not be specifically described herein.

Figure 4:
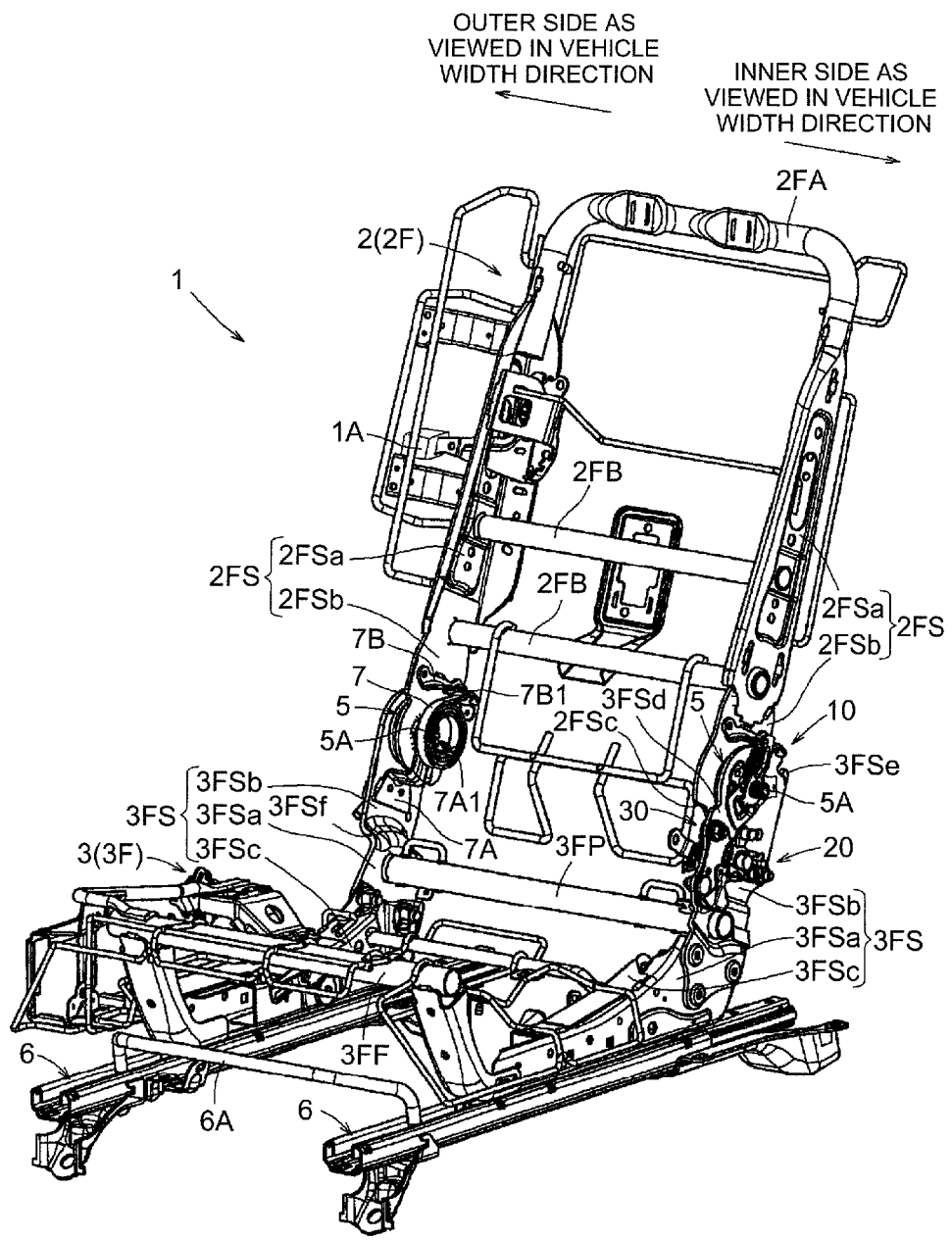
FIG. 4 is a perspective view showing the framework structure of the interior of the vehicle seat.
Figure 5:
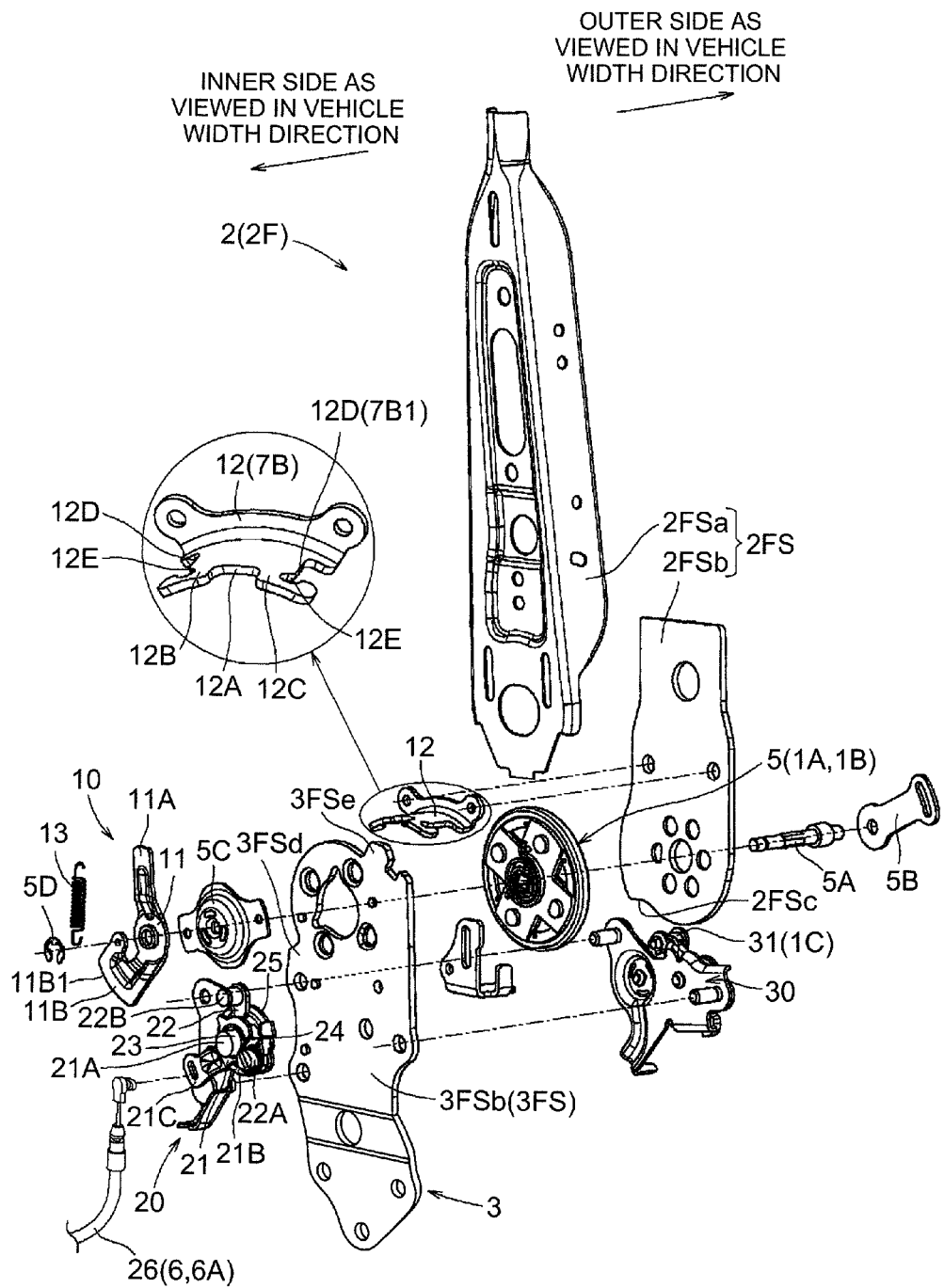
FIG. 5 is an exploded, perspective view showing the construction of a principal part of a side portion (on the inner side as viewed in the vehicle width direction) of the vehicle seat shown in FIG. 4.

A spiral spring 7 (see FIG. 4) that applies rotational bias force to the seat back 2 all the time toward the front of the seat is mounted between the seat back 2 and the seat cushion 3. With this arrangement, when the seat back 2 is released from the locked condition in which the backrest angle is fixed, the seat back 2 is raised up to a position at which the seat back 2 hits against the back of the seated passenger, under the bias force of the spiral spring 7, and the backrest angle of the seat back 2 is adjusted in accordance with the back-and-forward tilting motion of the back of the seated passenger. Thus, only a simple operation is required to adjust the backrest angle of the seat back 2. As shown in FIG. 4 and FIG. 5, the seat back 2 is rotatable within a region or range between positions at which a bracket 12 joined to a side frame 2FS (on the inner side as viewed in the vehicle width direction) of a seat-back frame 2F, which will be described later, abuts on and engages with a forward-tilt stopper 3FSd and a backward-tilt stopper 3FSe of a side frame 3FS (on the same side) of a seat-cushion frame 3F. The forward-tilt stopper 3FSd and backward-tilt stopper 3FSe are formed on a rear, upper edge portion of the side frame 3FS to protrude like horns.

When the user pulls up the W/I lever 1A or the cushion lever 1B, in a condition where no person is seated in the vehicle seat 1, as shown in FIG. 1, the seat back 2 as described above is raised up toward the front of the seat, and is tilted to and stopped at a position at which the seat back 2 is in a forward-inclined position as shown in FIG. 1, under the bias force of the spiral spring 7 (see FIG. 4). Along with the tilting movement of the seat back 2 to the forward-inclined position, the slide devices 6 are released from the locked conditions, so that the seat cushion 3 is switched to a condition where the seat cushion 3 can slide in the seat front-back direction.

With the slide devices 6 being released in accordance with the forward-tilting movement of the seat back 2, as described above, the vehicle seat 1 permits a walk-in (W/I) operation to slide the whole seat forward to place it in a retracted position, with the seat back 2 placed in the forward-inclined position to make the seat in a compact form. Through the walk-in operation, the vehicle seat 1 is provided with a wide boarding space through which a passenger to be seated in a third-row seat behind the seat 1 gets in or out of the vehicle, via a door (not shown) located next to the vehicle seat 1.

Figure 2:
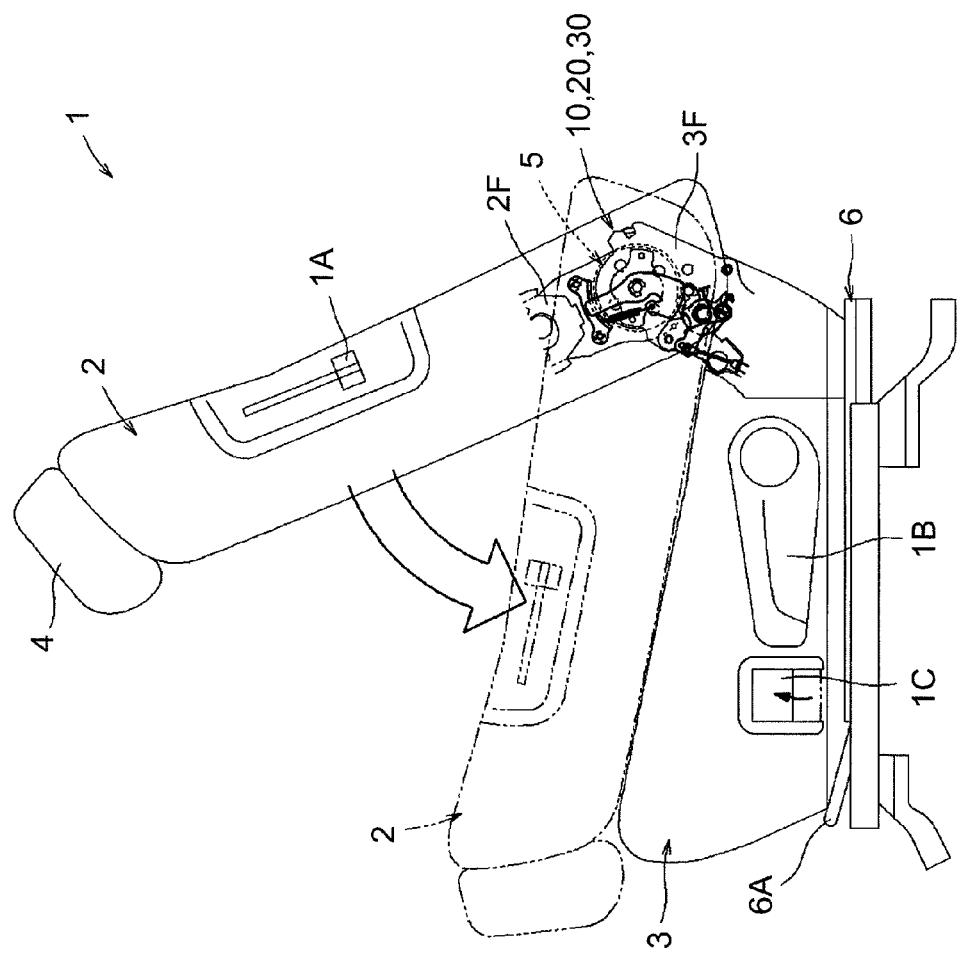
FIG. 2 is a side view schematically illustrating a fold-down operation of the vehicle seat.
Figure 3:
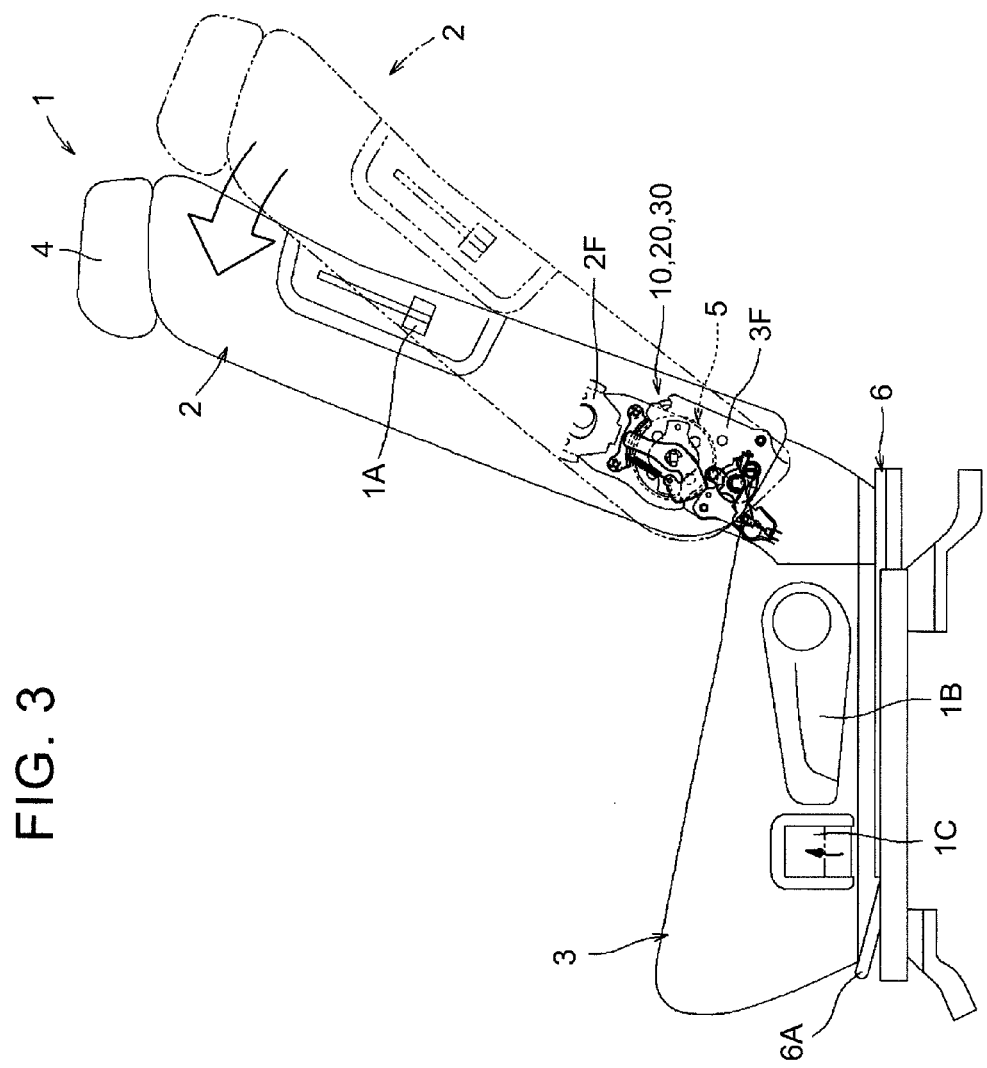
FIG. 3 is a side view schematically illustrating a reclining operation of the vehicle seat.
Figure 9:
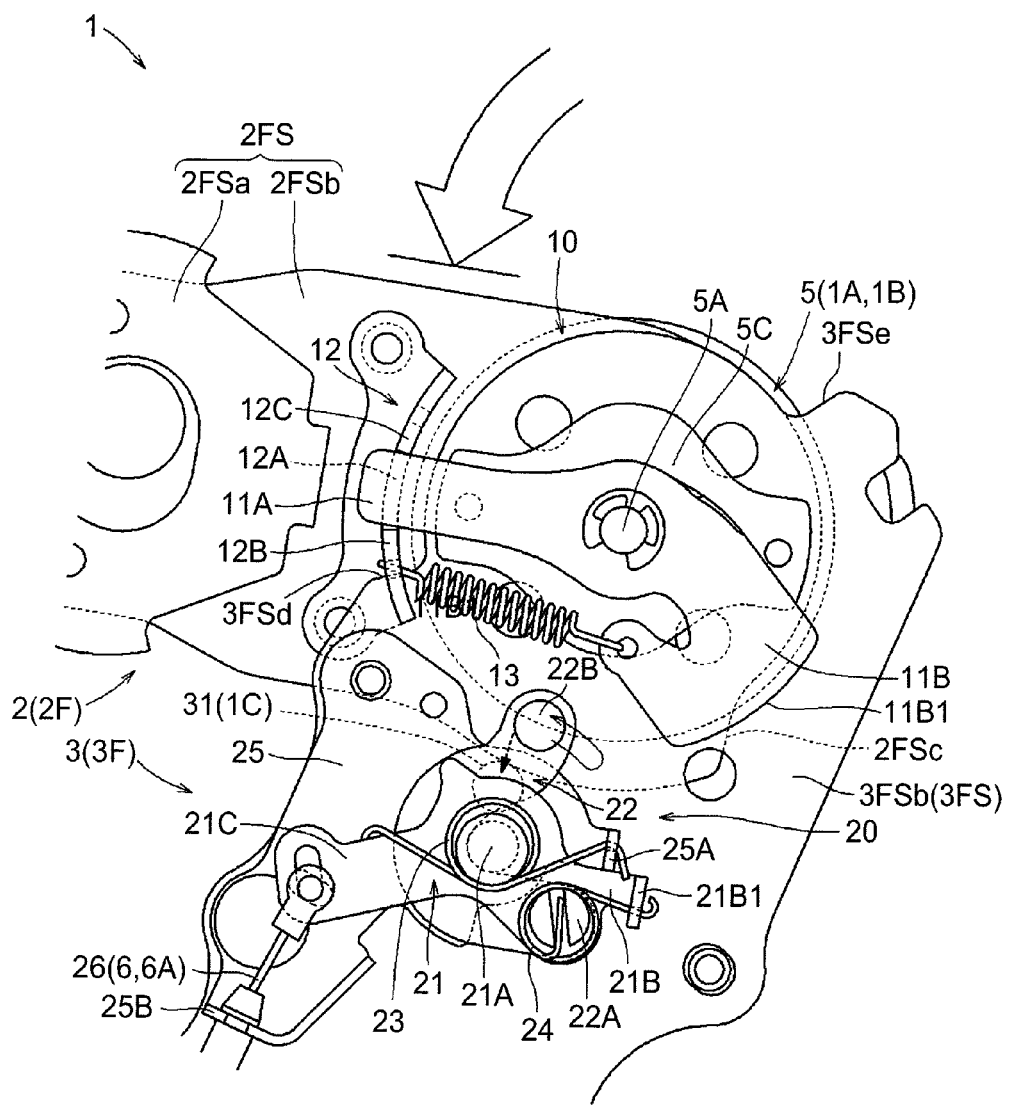
FIG. 9 is an enlarged view of the principal part showing a condition where the seat back is folded down to a substantially flat position.

If the user pulls up a F/D lever 1C provided at a front side portion (on the outer side as viewed in the vehicle width direction) of the seat cushion 3, after the seat back 2 is placed in the forward-inclined position through the pull-up operation on the W/I lever 1A or cushion lever 1B, as shown in FIG. 2, the seat back 2 is released from an engaged condition at the forward-inclined position, and is largely tilted forward down to a position at which the seat back 2 is folded on the top surface of the seat cushion 3. This operation will be called "fold-down (F/D) operation". More specifically, the seat back 2 is arranged to be largely tilted forward down to a position (substantially flat position) at which the bracket 12 (which will be described later) abuts on and engages with the forward-tilt stopper 3FSd, as shown in FIG. 9. As shown in FIG. 2, in accordance with the fold-down operation on the seat back 2, the slide devices 6 as described above are returned to the locked conditions, so that the slide position of the seat cushion 3 is fixed.

Thus, since the slide devices 6 are returned to the locked conditions in accordance with the fold-down operation on the seat back 2, the vehicle seat 1 can be brought into and fixed in a compact status in which the seat 1 as a whole is folded downward. In this condition, the back surface of the folded seat back 2 may be conveniently used as a table. In a condition where the seat back 2 is in a standing position where it is generally used as a backrest, the seat back 2 is normally kept from being folded down to the substantially flat position even if the F/D lever 1C is operated.

Namely, the fold-down operation is performed on the seat back 2 in the following manner. Initially, the W/I lever 1A or cushion lever 1B is operated so that the seat back 2 is tilted to the forward-inclined position. Then, the F/D lever 1C is operated in this condition, so that the seat back 2 is further tilted forward and folded down. Thus, the fold-down operation is performed on the seat back 2 via two-step manipulations, so that the seat back 2 can be largely tilted or folded down with increased safety, as compared with the arrangement in which the seat back 2 is tilted at a time down to the substantially flat position, via a single manipulation.

In the following, the construction of each part of the vehicle seat 1 will be described in greater detail. In the following description, the operation to tilt the seat back 2 to the forward-inclined position will be called "walk-in (W/I) operation", and the operation to further tilt the seat back 2 down to the substantially flat position will be called "fold-down (F/D) operation". First, the construction of the seat back 2 will be described. As shown in FIG. 4, the seat-back frame 2F that forms an internal framework of the seat back 2 has a pair of right and left side frames 2FS in the form of vertically long plates, an upper frame 2FA in the form of an inverted U-shaped pipe that extends between upper end portions of the side frames 2FS, and two reinforcement pipes 2FB in the form of laterally long pipes, which extend between the side frames 2FS and are arranged in the height direction. The side frames 2FS, upper frame 2FA, and the reinforcement pipes 2FB are assembled together to form an integral frame configuration of the seat-back frame 2F.

Each of the side frames 2FS has a thin-plate part 2FSa formed from a thin steel plate, and a thick-plate part 2FSb formed from a thick steel plate having a larger thickness than the thin-plate part 2FSa. The thin-plate part 2FSa and the thick-plate part 2FSb are integrally connected to each other in the vertical direction, to form the side frame 2FS. More specifically, the thin-plate part 2FSa is formed by cutting a thin sheet of steel into a vertically long shape, and then bending front and rear edge portions of the steel sheet inwardly of the seat, to form flanges. Thus, the thin-plate part 2FSa, whose edge portions are bent by press, has increased structural strength against bending or twisting thereof, and its outline or profile facing the outside of the seat (the front and rear sides of the seat and the outer side of the seat) has no angular portions.

Each of the thick-plate parts 2FSb is formed by cutting a steel plate having a larger thickness than the thin-plate part 2FSa, into a vertically long, flat plate. The thick-plate part 2FSb is firmly and integrally joined by welding to an inner surface (facing the inside of the seat) of a lower portion of the corresponding thin-plate part 2FSa, such that the inner surface of the thin-plate part 2FSa is superimposed on a surface of an upper portion of the thick-plate part 2FSb. The thick-plate parts 2FSb are joined with the reclining devices 5 that provide coupling parts between the seat-back frame 2F and the seat-cushion frame 3F, and are thus liable to receive high load during use; therefore, the thickness of the thick-plate part 2FSb is made larger than that of the thin-plate part 2FSa, so that the structural strength of the thick-plate part 2FSb is increased. The side frames 2FS each consisting of the thin-plate part 2FSa and the thick-plate part 2FSb form the right and left sides of the framework of the seat back 2, respectively, and are arranged at the respective side positions of the seat back 2 such that the surfaces of the side frames 2FS are opposed to each other in the seat width direction.

The upper frame 2FA is formed by cutting a circular steel tube to a given length, by press, and then bending the steel tube into a vertically inverted U shape. Opposite leg portions of the inverted U-shaped upper frame 2FA are attached and welded to upper end portions of the thin-plate parts 2FSa of the side frames 2FS, so as to be firmly and integrally joined to the upper end portions of the thin-plate parts 2FSa. An upper end portion of the thin-plate part 2FSa of each side frame 2FS is bent into a semi-cylindrical shape, so that the shape of the upper end portion matches that of an outer circumferential surface of each leg portion of the upper frame 2FA. Thus, each leg portion of the upper frame 2FA is brought into abutting contact with a wide area of the semi-cylindrical upper end portion of the corresponding thin-plate part 2FSa, and these portions of the upper frame 2FA and thin-plate part 2FSa are welded over a wide range, to be firmly and integrally joined.

Each of the reinforcement pipes 2FB is formed by cutting a circular steel tube to a given length, and is then inserted between the side frames 2FS so as to extend through the side frames 2FS in the seat width direction, such that each inserted end portion of the reinforcement pipe 2FB is welded and firmly and integrally joined to the corresponding side frame 2FS. More specifically, the upper reinforcement pipe 2FB is inserted between the thin-plate parts 2FSa of the side frames 2FS so as to extend through the thin-plate parts 2FSa in the seat width direction, and each of the inserted end portions is welded to the corresponding thin-plate part 2FSa, to be firmly and integrally joined to the part 2FSa. The lower reinforcement pipe 2FB is inserted between superimposed portions of the side frames 2FS in each of which the thin-plate part 2FSa and thick-plate part 2FSb are superimposed on each other in the seat width direction, so as to extend through the superimposed portions in the seat width direction, and each of the inserted end portions is welded to the superimposed thin-plate part 2FSa and thick-plate part 2FSb, to be firmly and integrally joined to these parts 2FSa, 2FSb. With this arrangement, the thin-plate part 2FSa and thick-plate part 2FSb of each side frame 2FS are more firmly and integrally joined to each other, via the lower reinforcement pipe 2FB inserted through the corresponding superimposed portion.

The seat-cushion frame 3F that forms an internal framework of the seat cushion 3 has a pair of right and left side frames 3FS in the form of longitudinally long plates, a front frame 3FF in the form of a laterally long pipe that extends between front end portions of the side frames 3FS, and a rear frame 3FR in the form of a laterally long pipe that extends between rear end portions of the side frames 3FS. The side frames 3FS, front frame 3FF, and the rear frame 3FR are assembled together to form an integral frame.

Each of the side frames 3FS is formed by integrally connecting a thin-plate part 3FSa formed from a thin steel plate, with a thick-plate part 3FSb formed from a thick steel plate having a larger thickness than the thin-plate part 3FSa. More specifically, the thin-plate part 3FSa is formed by cutting a sheet of thin steel plate into a longitudinally long shape, and then bending its upper and lower edge portions inwardly of the seat, to form flanges. Further, a reinforcement plate 3FSc is integrally welded and joined to each thin-plate part 3FSa, such that the reinforcement plate 3FSc bridges over the inwardly bent upper and lower edge portions of the thin-plate part 3FSa, so as to close the opening of the thin-plate part 3FSa having a laterally-facing U shape in cross section. With this arrangement, the thin-plate part 3FSa has increased structural strength against bending or twisting thereof, and its outline or profile facing the outside of the seat (the front and rear sides of the seat and the outer side of the seat) has no angular portions.

Each of the thick-plate parts 3FSb is formed by cutting a steel plate having a larger thickness than the thin-plate part 3FSa, into a vertically long shape. The thick-plate part 3FSb is firmly and integrally joined by welding to an outer surface (facing the outside of the seat) of a rear-end upper portion of the corresponding thin-plate part 3FSa, such that a surface of a lower portion of the thick-plate part 3FSb is superimposed on the outer surface of the rear-end upper portion of the thin-plate part 3FSa. The thick-plate parts 3FSb are joined to the reclining devices 5 that provide coupling parts between the seat-back frame 2F and the seat-cushion frame 3F, and are thus liable to receive high load during use; therefore, the thickness of the thick-plate part 3FSb is made larger than that of the thin-plate part 3FSa, so that the structural strength of the thick-plate part 3FSb is increased.

The side frames 3FS each consisting of the thin-plate part 3FSa and the thick-plate part 3FSb form the right and left sides of the framework of the seat cushion 3, respectively, and are arranged at the respective side positions of the seat cushion 3 such that the surfaces of the side frames 3FS are opposed to each other in the seat width direction. More specifically, the longitudinally elongate thin-plate parts 3FSa of the side frames 3FS are respectively mounted on and fixed to upper surface portions of the right and left slide devices 6 provided on the floor as described above.

As shown in FIG. 4 and FIG. 5, the thick-plate part 3FSb of the side frame 3FS (on the inner side as viewed in the vehicle width direction) of the seat cushion 3 has the above-mentioned forward-tilt stopper 3FSd and backward-tilt stopper 3FSe, which are formed in front and rear portions of an upper edge portion of the thick-plate part 3FSb. Also, the bracket 12 arranged to abut on the forward-tilt stopper 3FSd and backward-tilt stopper 3FSe to be stopped is joined to the outer surface of the thick-plate part 2FSb (on the same side) of the seat back 2. Thus, the forward-tilt stopper 3FSd, backward-tilt stopper 3FSe, and the bracket 12, which form a structure for limiting or stopping tilting of the seat back 2, are respectively provided on the thick-plate part 3FSb of the seat cushion 3 and the thick-plate part 2FSb of the seat back 2, which have high structural strength, and are thus able to limit or stop tilting of the seat back 2 with high reliability.

As shown in FIG. 4, the above-mentioned spiral spring 7 that applies rotational bias force to the seat back 2 toward the front of the seat is mounted between the side frame 2FS (on the outer side as viewed in the vehicle width direction or the left-hand side in FIG. 4) of the seat back 2 and the side frame 3FS (on the outer side as viewed in the vehicle width direction) of the seat cushion 3. More specifically, an inner end portion of the spiral spring 7 is engaged with an upwardly-extending engaging portion 7A1 of a spring engaging plate 7A joined onto an inner surface of the thick-plate part 3FSb of the side frame 3FS of the seat cushion 3, and an outer end portion of the spiral spring 7 is engaged with and fixed to a spring engaging recessed portion 7B1 as a rear edge portion of a spring engaging plate 7B joined onto an inner surface of the thick-plate part 2FSb of the side frame 2FS of the seat back 2. In this connection, the spring engaging plate 7B is the same component as the bracket 12 which will be described later. Thus, the spiral spring 7 is mounted between the thick-plate part 2FSb of the seat back 2 and the thick-plate part 3FSb of the seat cushion 3, both of which have high structural strength. With this arrangement, the spiral spring 7 designed to provide strong rotational bias force with which a heavy object, such as the seat back 2, can be raised up is firmly mounted between the seat back 2 and the seat cushion 3.

The thick-plate part 3FSb of the side frame 3FS (on the outer side as viewed in the vehicle width direction) of the seat cushion 3 has an offset portion 3FSf as an intermediate portion. The offset portion 3FSf is formed in a stepped shape such that its lower portion is bent like a crank and recessed inwardly of the seat, relative to its upper portion. With the thick-plate part 3FSb thus formed in the stepped shape so as to be recessed inwardly of the seat, a wide space is provided into which the passenger to be seated in the third-row seat steps when getting in or out of the vehicle via the door (not shown) next to the vehicle seat 1.

The front frame 3FF is formed by cutting a circular steel tube to a give length, and placing it between front end, upper portions of the thin-plate parts 3FSa of the side frames 3FS such that the front frame 3FF extending in the seat width direction is integrally welded to and fixed to the thin-plate parts 3FSa. The rear frame 3FR is formed by cutting a circular steel tube to a given length, and inserting it between the thick-plate parts 3FSb of the side frames 3FS such that the rear frame 3FR extending through the thick-plate parts 3FSb in the seat width direction is welded at its end portions to the side frames 3FS. Thus, the rear frame 3FR is firmly and integrally joined to the thick-plate parts 3FSb of the side frames 3FS.

Next, the construction of a detection mechanism 10 that picks up movement of the seat back 2 during the walk-in operation, and an operating mechanism 20 that releases the slide devices 6 from the locked conditions, depending on the amount of movement of the seat back 2 detected by the detection mechanism 10, will be described. As shown in FIG. 4 and FIG. 5, the detection mechanism 10 and the operating mechanism 20 are disposed on an outer side surface of the side frame 3FS (on the inner side as viewed in the vehicle width direction) of the seat cushion 3. The detection mechanism 10 consists of an operating link 11 that is rotatably mounted on the side frame 3FS of the seat cushion 3, the bracket 12 fixed to the side frame 2FS of the seat back 2, and a tension spring 13 mounted between the bracket 12 and the operating link 11 for engagement therewith.

As shown in FIG. 5, the operating link 11 is rotatably mounted on an operating shaft 5A that is inserted through a central portion of the reclining device 5. More specifically, the operating shaft 5A is inserted through a central portion of the operating link 11, and a distal end portion of the operating shaft 5A is retained by an E ring 5D to be prevented from being pulled out in the axial direction, so that the operating link 11 is rotatably mounted on or pivotally supported by the operating shaft 5A. A plate bracket 5C, whose central portion is curved like a hill, is integrally joined to the side frame 3FS of the seat cushion 3. The operating link 11 is sandwiched between the E ring 5D and the plate bracket 5C, such that the link 11 is not largely in surface contact with the other components in the axial direction. With this arrangement, the operating link 11, which is positioned in the axial direction relative to the operating shaft 5A, is supported so as to be smoothly rotatable.

More specifically, the operating shaft 5A is inserted in the axial direction from the inside of the seat, through the side frame 2FS of the seat back 2, a central portion of the reclining device 5, the side frame 3FS of the seat cushion 3, the plate bracket 5C integrally joined to the side frame 3FS, and the operating link 11, in the order of description, and the E ring 5D is fitted on the distal end portion of the operating shaft 5A, so that the shaft 5A is prevented from being pulled out in the axial direction. The operating shaft 5A is normally held in a fixed position, due to holding force with which the reclining device 5 is held in a locked condition under bias force of a spring (not shown).

An operating arm 5B that is integrally joined to a proximal end portion (on the inner side of the seat) of the operating shaft 5A is arranged to rotated via a cable (not shown) when the above-mentioned W/I lever 1A or cushion lever 1B is operated. When the operating arm 5B is rotated, the operating shaft 5A is rotated against the above-mentioned spring bias force, so as to release the reclining device 5 from the locked condition. Although not shown in the drawings, the reclining device 5 on the outer side as viewed in the vehicle width direction in FIG. 4 is also provided with a manipulation structure that consists of the operating shaft 5A and the operating arm 5B, which are arranged to be rotated when the W/I lever 1A or cushion lever 1B is operated. With this arrangement, when the W/I lever 1A or cushion lever 1B is operated, the reclining devices 5 on the opposite sides of the seat are synchronously released from the locked conditions at the same time.

Figure 6:
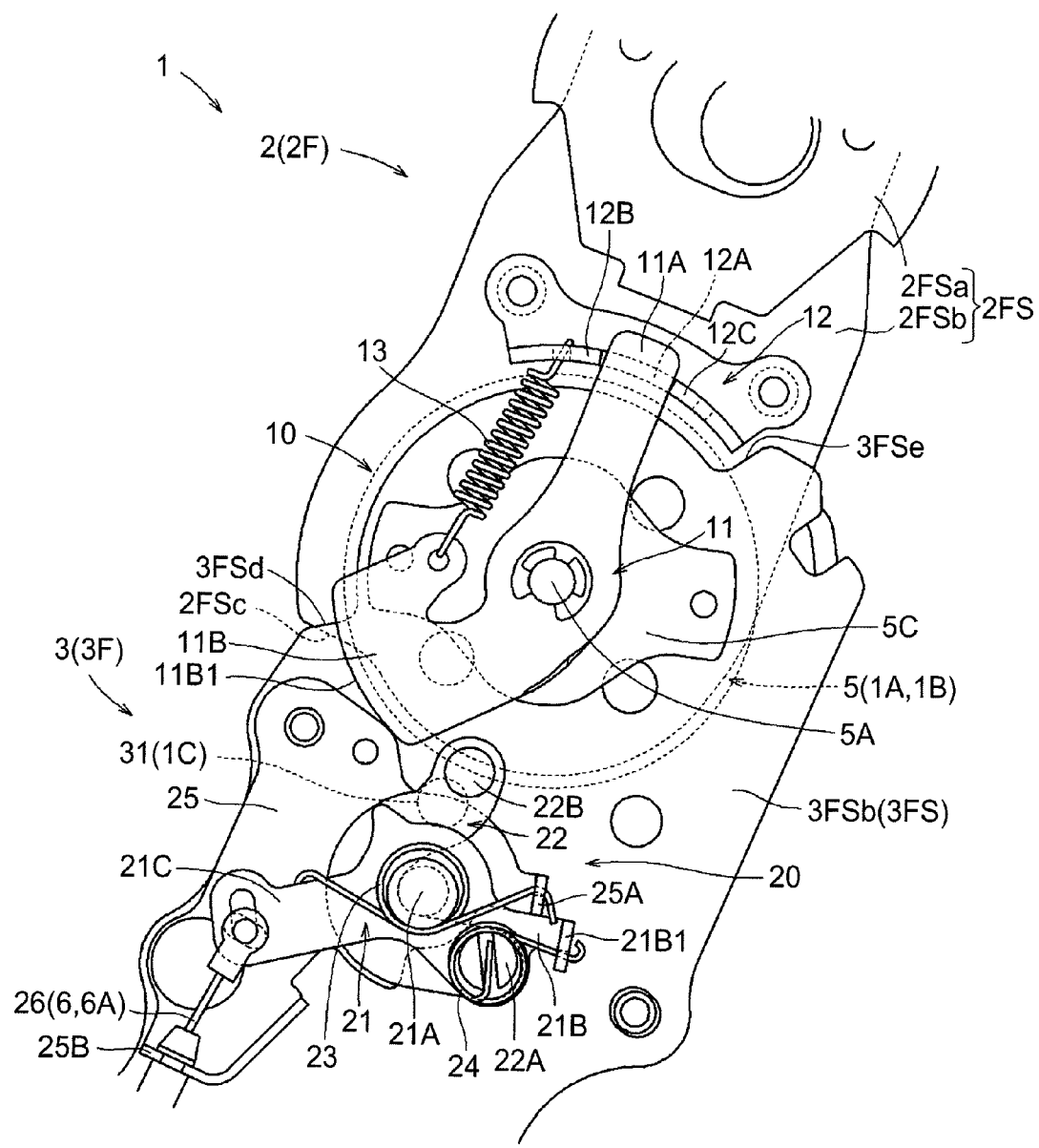
FIG. 6 is an enlarged view of the principal part showing a condition where the seat back is in the initial position.
Figure 7:
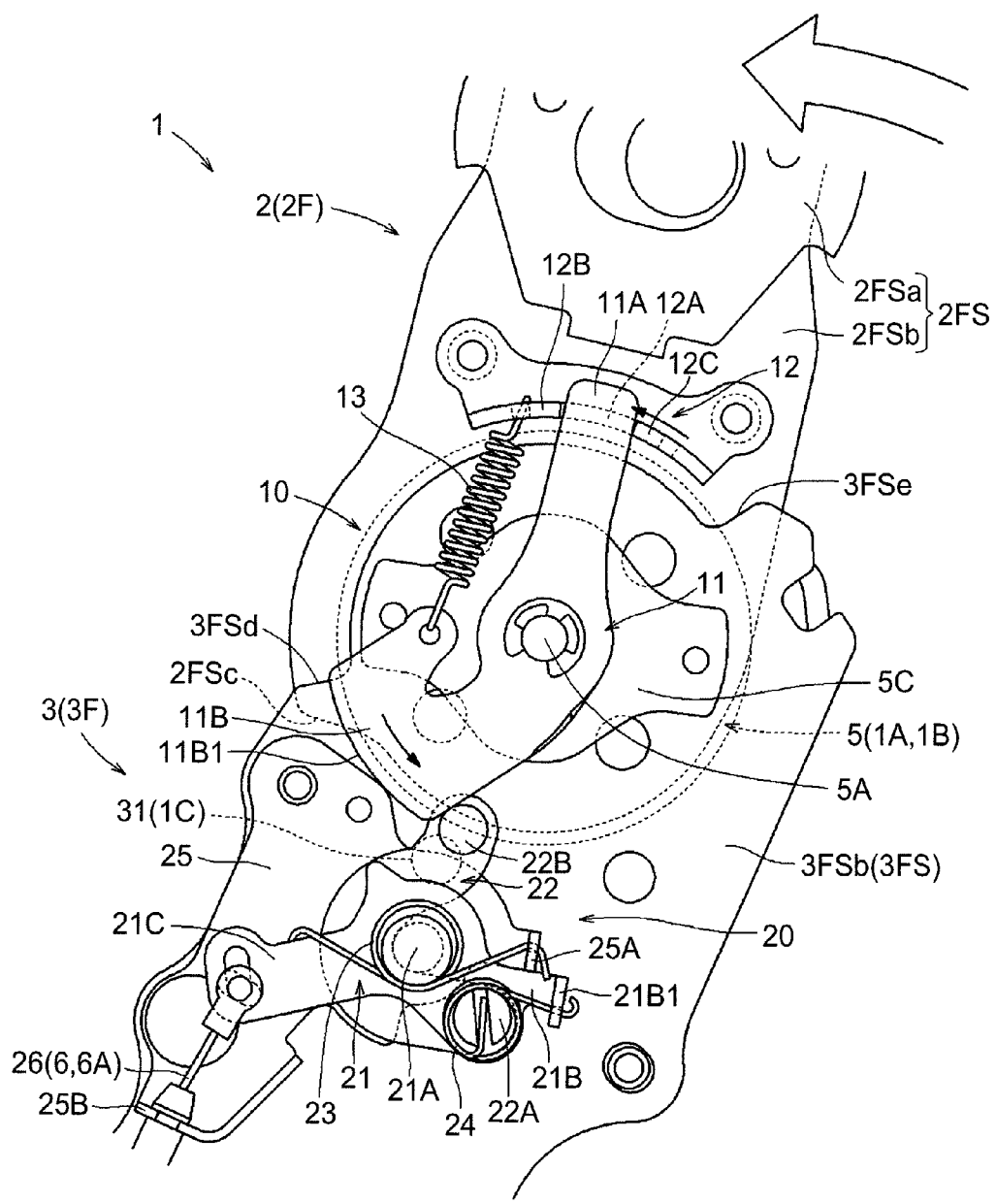
FIG. 7 is an enlarged view of the principal part showing a condition where the seat back is in the middle of the walk-in operation.
Figure 8:
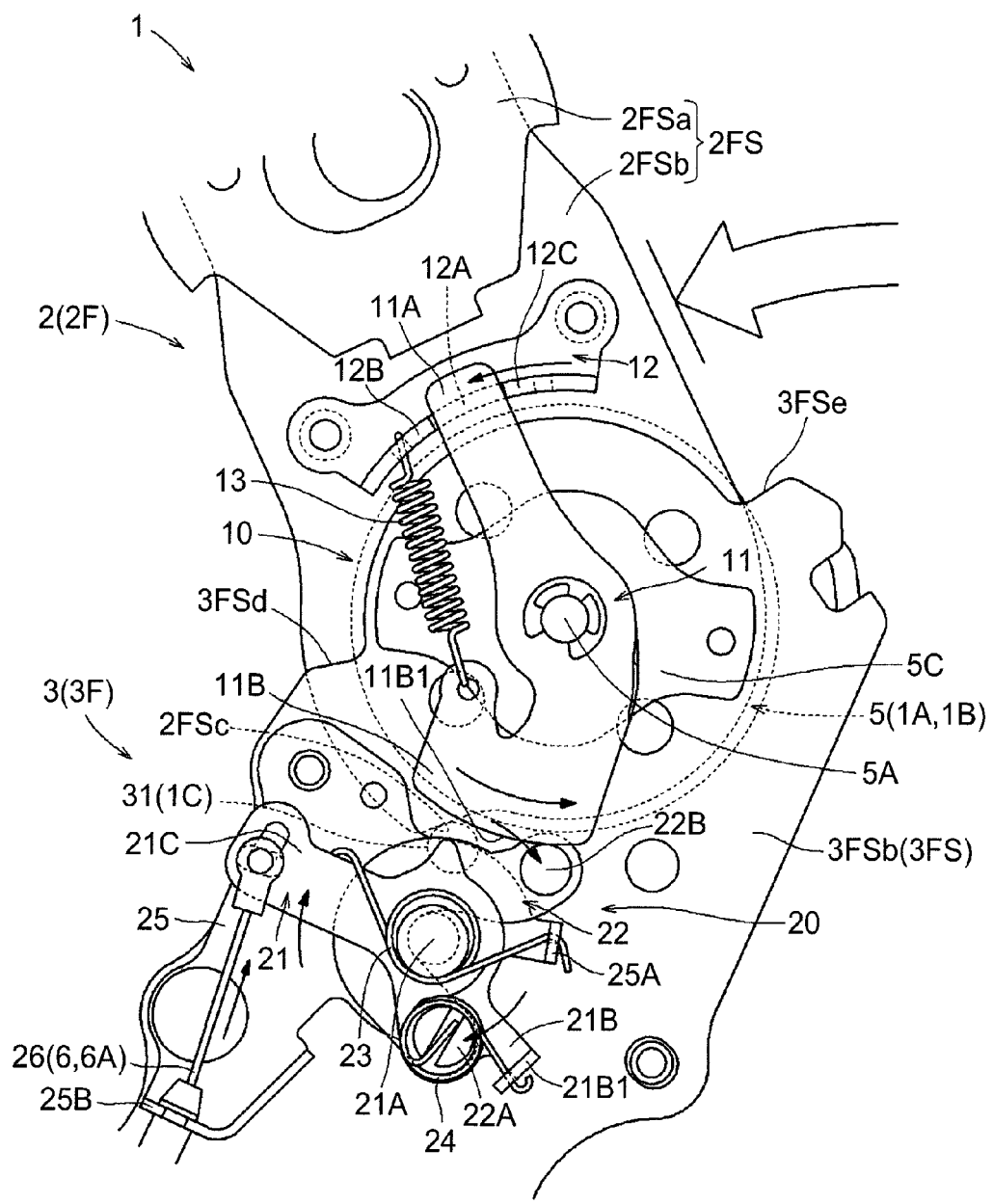
FIG. 8 is an enlarged view of the principal part showing a condition where the seat back is tilted to a forward-inclined position.
Figure 11:
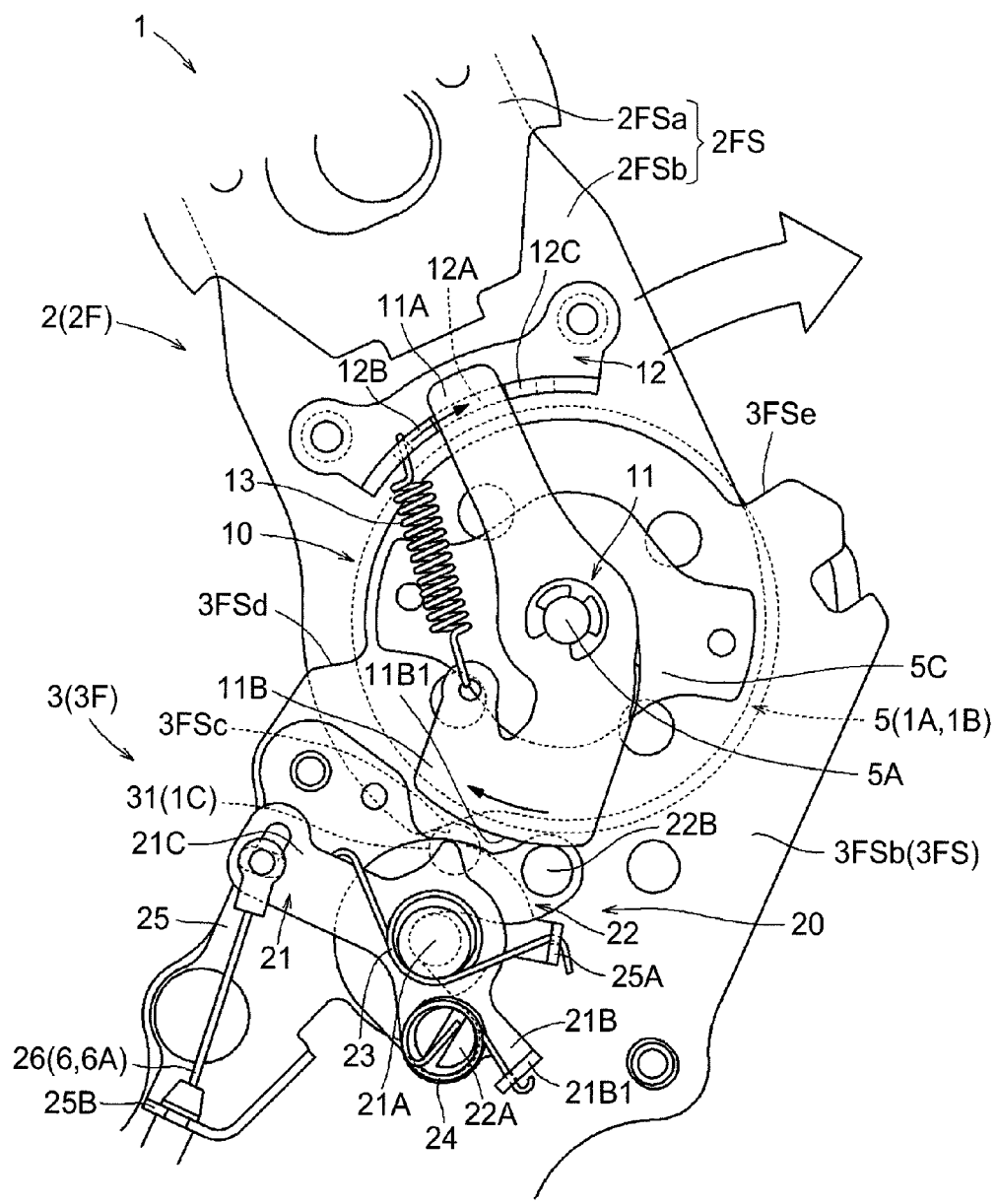
FIG. 11 is an enlarged view of the principal part showing a condition where the seat back is being raised up from the forward-inclined position.

As shown in FIG. 6, the operating link 11 as described above has a kicked portion 11A that extends upwardly of the seat from the central portion pivotally supported by the operating shaft 5A. The kicked portion 11A is passed through a recessed portion 12A of the bracket 12, so as to be sandwiched at the front and rear sides thereof by the bracket 12. With this arrangement, when the seat back 2 is tilted forward, as shown in FIG. 7 and FIG. 8, the kicked portion 11A is pushed or kicked from the rear side by a rear portion 12C of the bracket 12, so as to be forced to rotate in the counterclockwise direction as seen in FIG. 7 and FIG. 8. When the seat back 2 is raised up from a forward-tilted condition to the rear side, as shown in FIG. 11, the operating link 11 is pushed or kicked from the front side by a front portion 12B of the bracket 12, so as to be forced to rotate in the clockwise direction as seen in FIG. 11.

As shown in FIG. 5, the bracket 12 is formed by bending in the form of an L-shaped plate, and its plate portion whose surface extends in the height direction is integrally fastened and fixed onto the outer surface of the thick-plate part 2FSb of the side frame 2FS of the seat back 2. The bracket 12 has the recessed portion 12A formed in a distal edge portion of a bent portion that extends from its joint with the side frame 2FS of the seat back 2 toward the outside of the seat. The recessed portion 12A is formed by notching the distal edge portion of the bracket 12 in a rectangular shape. The kicked portion 11A of the operating link 11 is inserted into the recessed portion 12A from the outside of the seat, and set in the recessed portion 12A. With this arrangement, the bracket 12 receives the kicked portion 11A of the operating link 11, such that the kicked portion 11A is sandwiched between the front portion 12B and the rear portion 12C on the opposite sides of the recessed portion 12A.

The tension spring 13 is engaged between a pressing portion 11B that extends from a central portion of the operating link 11 in the forward, downward direction of the seat to spread in a fan shape, and the front portion 12B of the bracket 12. The tension spring 13 is arranged to apply rotational bias force to the operating link 11 in the clockwise direction. Due to the bias force of the tension spring 13, the operating link 11 is normally held in a condition in which the kicked portion 11A is pressed against the rear portion 12C of the bracket 12, so that rattling is less likely or unlikely to occur between the operating link 11 and the bracket 12, in the rotational direction.

The bracket 12 has spring engaging recessed portions 12D formed by notching front and rear edge portions of its plate portion that extends outwardly of the seat, in generally rectangular shape. The bracket 12 further has extended recessed portions 12E in the form of circular holes formed at corner portions (on the outer side of the seat) of the spring engaging recessed portions 12D, to be continuous with the corner portions. The front one of the extended recessed portions 12E functions as an engaging portion for engaging an upper end portion of the tension spring 13 with the front portion 12B of the bracket 12, and the rear one is not used in this embodiment, but formed so that the same component can be used in other ways or applications, such as when the bracket 12 is used in a longitudinally opposite direction. The spring engaging recessed portions 12D are also not used in this embodiment. As shown in FIG. 4, in the above-mentioned spring engaging plate 7B provided by the same component as the bracket 12, the rear one of the spring engaging recessed portions 12D functions as a portion (spring engaging recessed portion 7B1) for engaging with the outer end portion of the spiral spring 7.

Referring next to FIG. 5 and FIG. 6, the operating mechanism 20 will be described. The operating mechanism 20 consists of an output link 21, intermediate link 22, holding spring 23, pressing spring 24, fixed plate 25, and a cable 26. As shown in FIG. 6, the output link 21 is rotatably supported by a support shaft 21A on an outer surface of the thick-plate part 3FSb of the side frame 3FS of the seat cushion 3. More specifically, the output link 21 is rotatably mounted on the fixed plate 25 integrally joined onto the thick-plate part 3FSb, by means of the support shaft 21A. The fixed plate 25 is firmly and integrally joined by welding onto the outer surface of the thick-plate part 3FSb.

The holding spring (torsion spring) 23 is engaged between the output link 21 and an engaging piece 25A formed by cutting and raising a part of the fixed plate 25. Due to the bias force of the holding spring 23, the output link 21 is normally urged to rotate in the counterclockwise direction as seen in FIG. 6, and held in a rotational position at which an engaging arm 21B that extends to the right (in FIG. 6) from a central portion of the link 21 is pressed against the engaging piece 25A of the fixed plate 25. The holding spring 23 has a central rolled portion that is rolled around the support shaft 21A, and one end (on the right-hand side in FIG. 6) of the holding spring 23 is engaged with the engaging piece 25A, while the other end (on the left-hand side in FIG. 6) is engaged with and fixed to an operating arm 21C that extends to the left (in FIG. 6) from the central portion of the output link 21.

The intermediate link 22 is formed in a C-shaped curved form, and its lower end portion is rotatably mounted on the output link 21 by means of a coupling shaft 22A. More specifically, the coupling shaft 22A is integrally joined to the intermediate link 22, and is rotatably mounted to the engaging arm 21B of the output link 21. The pressing spring (torsion spring) 24 is engaged between the intermediate link 22 and the output link 21, and the intermediate link 22 is normally urged to rotate in the clockwise direction, under the bias force of the pressing spring 24, and held in a rotational position at which the C-shaped, curved arm of the link 22 is pressed against and engaged with the support shaft 21A of the output link 21. The pressing spring 24 has an inner end portion that is engaged with and fixed to a head portion of the coupling shaft 22A integral with the intermediate link 22, and an outer end portion that is engaged with and fixed to an engaging piece 21B1 formed by bending a distal end portion of the engaging arm 21B of the output link 21.

When the seat back 2 is at an angular position at which it is used as a backrest, as shown in FIG. 6, a kick pin 22B joined to an upper end portion of the intermediate link 22 is held in an initial position in which the kick pin. 22B is spaced rearward from the pressing portion 11B of the operating link 11 as described above. However, when the walk-in operation is performed on the seat back 2, and the kicked portion 11A of the operating link 11 is pushed and rotated forward by the rear portion 12C of the bracket 12, as shown in FIG. 7, the pressing portion 11B of the operating link 11 is pressed against the kick pin 22B of the intermediate link 22. As a result, the intermediate link 22 is pushed and rotated in such a direction as to be pressed against the support shaft 21A, as shown in FIG. 8, and is rotated in the clockwise direction (in FIG. 8) around the support shaft 21A, integrally with the output link 21 coupled to the intermediate link 22 via the coupling shaft 22A. With the output link 21 thus rotated, the cable 26 linked to the tip of the operating arm 21C of the output link 21 is pulled, so that the slide devices 6 are released from the locked conditions.

The cable 26 has a twofold cable structure in which a wire member is inserted through an interior of a flexible tubular member. An upper end portion of the tubular member of the cable 26 is engaged with and fixed to a cable engaging piece 25B formed by cutting and bending from the fixed plate 25, and an upper end portion of the wire member that is pulled out of the upper end portion of the tubular member is engaged with and fixed to a distal end portion of the leftward-extending operating arm 21C of the output link 21. The other end portion (not shown) of the cable 26 is connected to the release lever 6A operable to release the slide devices 6 from the locked conditions as shown in FIG. 4. With this arrangement, when the walk-in operation on the seat back 2 causes the intermediate link 22 and the output link 21 to be rotated together in the clockwise direction, as shown in FIG. 8, the cable 26 is pulled upward (in FIG. 8) by the output link 21, so as to operate the release lever 6A (see FIG. 4) connected to the other end portion thereof, to release the slide devices 6 from the locked conditions.

When the seat back 2 is tilted to and stopped at the forward-inclined position, as shown in FIG. 8, the kick pin 22B of the intermediate link 22 is held in a condition where the kick pin 22B rides on an outer circumferential surface 11B1 of the pressing portion 11B of the operating link 11, so that the cable 26 is held in a pulled condition. As a result, the slide devices 6 (see FIG. 4) are held in the released conditions.

In the condition where the seat back 2 is tilted to and stopped at the forward-inclined position, pressing force is applied from the kick pin 22B of the intermediate link 22 to the outer circumferential surface 11B1 of the pressing portion 11B of the operating link 11, radially inwards or toward the central portion of the operating link 11, due to the effect of spring force of the holding spring 23 and pressing spring 24, and the effect of spring force of spring members (not shown) provided in the slide devices 6 (FIG. 4) for applying bias force to the slide devices 6 so as to place them in the locked conditions. Accordingly, during the walk-in operation of the seat back 2, the operating link 11 is forcedly pushed and rotated forward by the rear portion 12C of the bracket 12, so that the operating link 11 can smoothly push and rotate the kick pin 22B. However, when the seat back 2 is returned to the standing position, from the condition where the kick pin 22B rides on the outer circumferential surface 11B1 of the pressing portion 11B of the operating link 11, the operating link 11 may not be easily returned be the original position, due to resistance caused by pressing force applied radially inwards from the kick pin 22B to the operating link 11.

However, even when the seat back 2 is raised up rearwards from the forward-inclined position, as shown in FIG. 11, the operating link 11 is forcedly pushed back by the front portion 12B of the bracket 12 in accordance with the operation to raise up the seat back 2, and is thus smoothly returned to the original rotational position, integrally with the seat back 2, even if it receives resistance caused by pressing force of the kick pin 22B as described above.

When the seat back 2 is further tilted or folded down from the forward-inclined position (the condition of FIG. 8) established through the walk-in operation, to the substantially flat position, as shown in FIG. 9, the kick pin 22B of the intermediate link 22 rides over and goes forward beyond the outer circumferential surface 11B1 of the pressing portion 11B of the operating link 11 following the fold-down movement, and is disengaged from the pressing portion 11B. As a result, the intermediate link 22 and the output link 21 that has been pressed and rotated integrally with the intermediate link 22 are returned to the initial positions prior to the rotation thereof, and the cable 26 is released from the pulled-up condition. As a result, the slide devices 6 (see FIG. 4) are returned to the locked conditions again.

Figure 10:
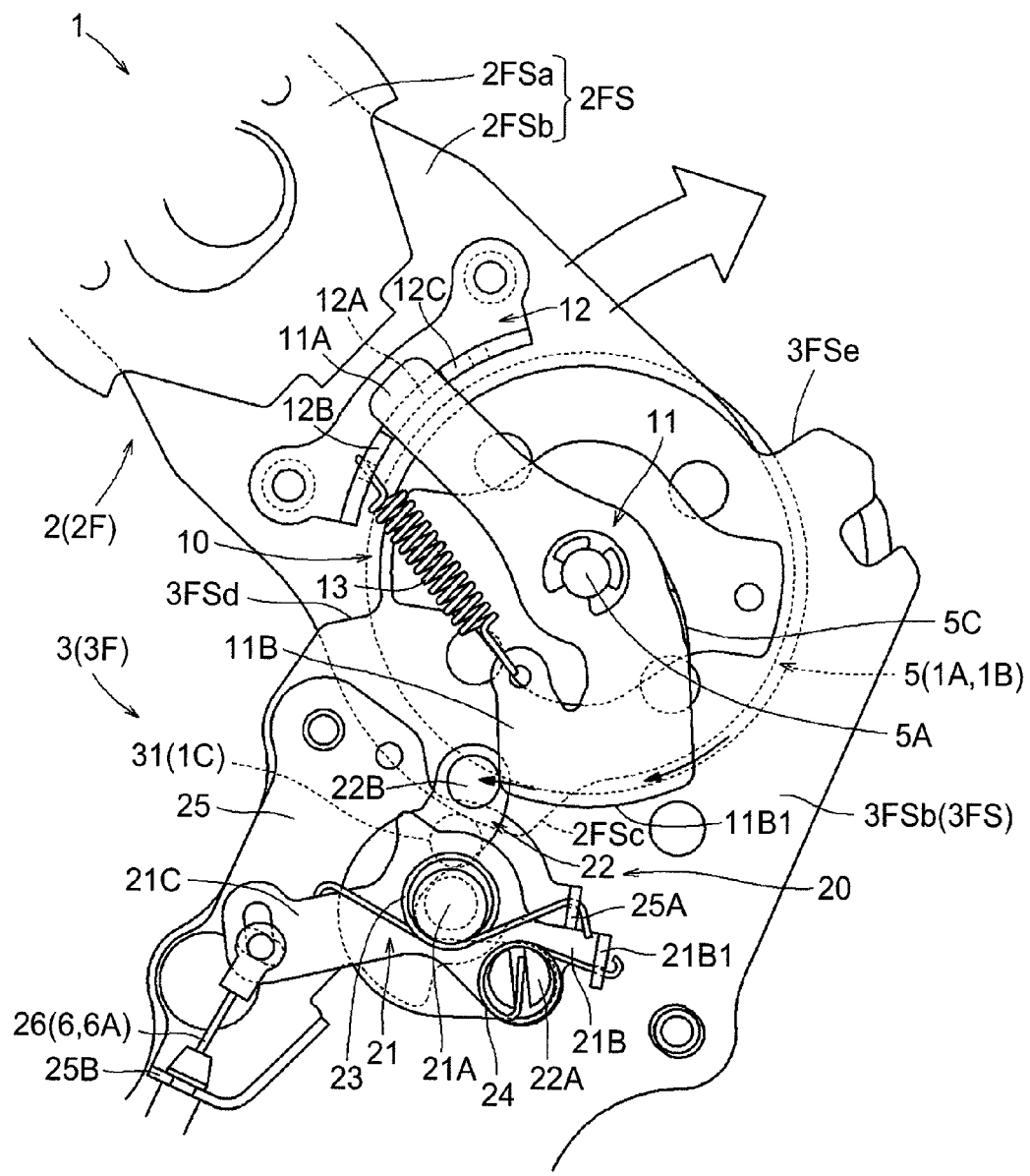
FIG. 10 is an enlarged view of the principal part showing a condition where the seat back is being raised up from the substantially flat position.

However, if the kick pin 22B of the intermediate link 22 goes forward beyond the pressing portion 11B of the operating link 11, the positional relationship as viewed in the front-back direction between the kick pin 22B and the pressing portion 11B is reversed. Therefore, when the seat back 2 is raised up, the pressing portion 11B of the operating link 11 presses the kick pin 22B of the intermediate link 22 in the reverse direction (from the back side). However, when the pressing portion 11B of the operating link 11 presses the kick pin 22B of the intermediate link 22 from the back side, the intermediate link 22 is pushed and rotated alone about the coupling shaft 22A, relative to the output link 21, in the counterclockwise direction, against the bias force of the pressing spring 24, as shown in FIG. 10, so as to permit the above movement by freely rotating. Thus, the operation to raise up the seat back 2 from the substantially flat position is not impeded. The kick pin 22B of the intermediate link 22 is disengaged from the pressing portion 11B, when the seat back 2 is raised up from the substantially flat position, and the kick pin 22B goes backward beyond the outer circumferential surface 11B1 of the pressing portion 11B of the operating link 11. As a result, the intermediate link 22 is returned to the initial position, like the condition of FIG. 6, established before it rotates freely.

During the movement of the seat back 2 from the substantially flat position to the standing angular position as described above, the operating link 11 is forcedly pushed and rotated by the front portion 12B of the bracket 12 in accordance with the operation to raise up the seat back 2. Therefore, even if the operating link 11 receives resistance when it presses the kick pin 22B of the intermediate link 22 from the back side, the operating link 11, which is rotated integrally with the seat back 2, is smoothly pushed back to a given standing rotational position.

Referring to FIG. 4, the construction of a stopper mechanism 30 that can hold the seat back 2 at the forward-inclined position after the walk-in operation is performed on the seat back 2 will be described. The stopper mechanism 30 is disposed on an inner side surface portion of the side frame 3FS (on the inner side as viewed in the vehicle width direction) of the seat cushion 3, and has a stopper pin 31. When the seat back 2 is tilted to the forward-inclined position, as shown in FIG. 8, an engaging face 2FSc formed on a front, lower edge portion of the thick-plate part 2FSb of the side frame 2FS of the seat back 2 to protrude like a horn is brought into abutment with the stopper pin 31, so that the tilting of the seat back 2 is stopped at the forward-inclined position.

As shown in FIG. 6, the stopper pin 31 is normally held in an upwardly protruding condition in which the stopper pin 31 is able to stop tilting rotation of the seat back 2 at the forward-inclined position. In this condition, if the seat back 2 is tilted to the forward-inclined position, and the stopper pin 31 abuts on the engaging face 2FSc, as shown in FIG. 8, the stopper pin 31 is held at a given position so as not to be pushed backward. Thus, the user can switch the vehicle seat from a condition in which the seat back 2 is in the normal, standing position, to a condition in which the seat back 2 is tilted forward and stopped and held at the forward-inclined position where the engaging face 2FSc abuts on the stopper pin 31, only by operating the above-described W/I lever 1A or cushion lever 1B.

If the user operates the above-described F/D lever 1C, in the condition where the seat back 2 is tilted to and held at the forward-inclined position, the stopper pin 31 is moved/operated to retract downward, so as to be disengaged from the engaging face 2FSc of the seat back 2. The engaging face 2FSc is formed such that it faces in forward tilting direction of the seat back 2. More specifically, a rising face of the engaging face 2FSc is formed as a gently inclined face, which is inclined in a backward tilting direction of the seat back 2 relative to the direction toward the center of rotation of the seat back 2. With this arrangement, the operation to pull the stopper pin 31 downward, from a condition where the engaging face 2FSc is pressed against and engaged with the stopper pin 31, can be smoothly performed without causing biting. When the stopper pin 31 is disengaged from the engaging face 2FSc as described above, the seat back 2 is brought into a condition where it can be further tilted forward. In this condition, the seat back 2 is further tilted and folded down to the substantially flat position as shown in FIG. 9.

Thus, according to the construction of the vehicle seat 1 of this embodiment, the bracket 12 and the operating link 11 are engaged with each other such that the bracket 12 sandwiches the operating link 11 in rotational directions thereof, so that the operating link 11 abuts on the bracket 12 no matter which direction in which the bracket 12 rotates. It is thus possible to rotate the operating link 11 in accordance with the rotational movement of the seat back 2, without increasing the number of components.

Figure 12:
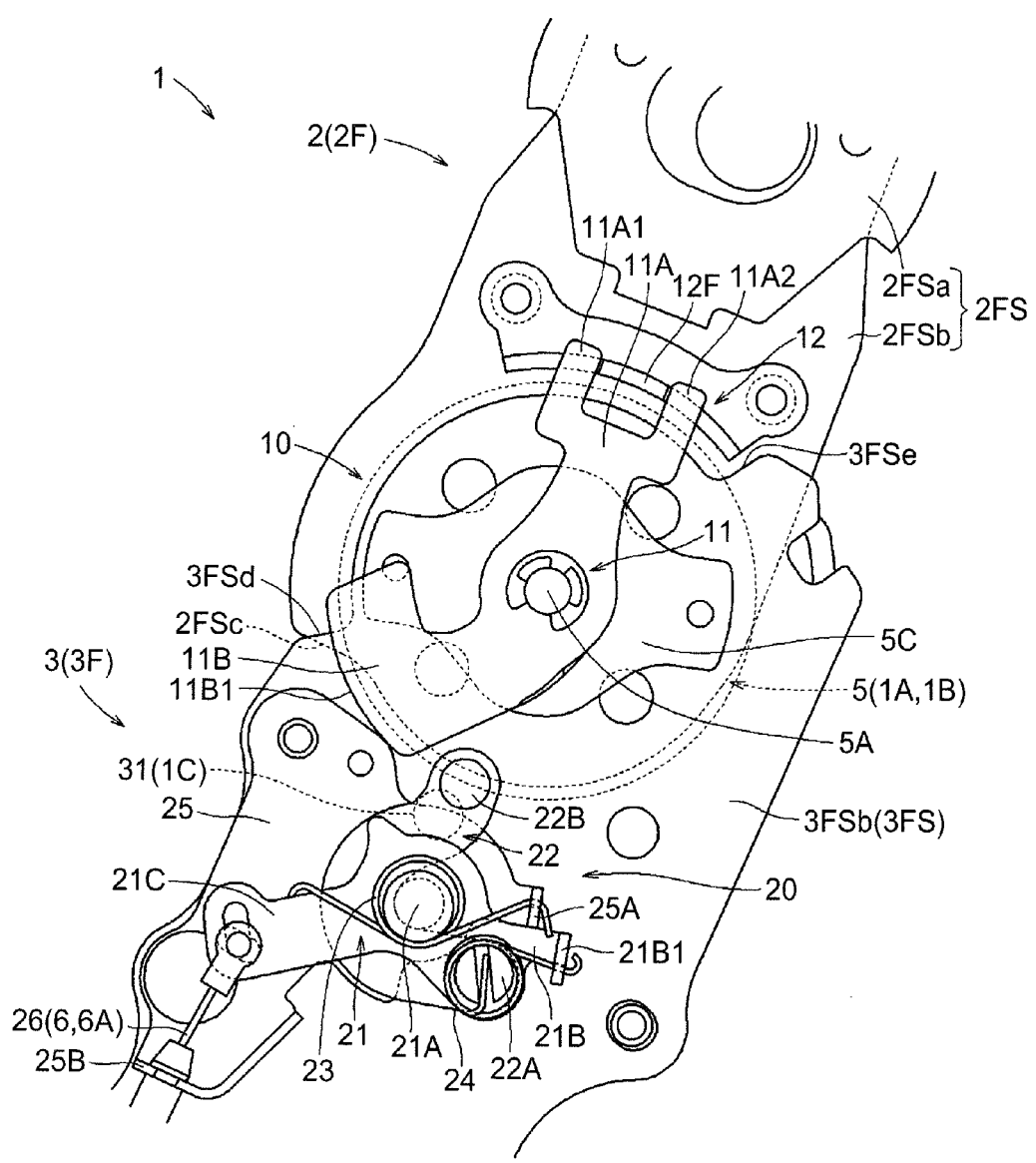
FIG. 12 is an enlarged view of a principal part of a vehicle seat according to a second embodiment of the invention.

Next, the construction of a vehicle seat 1 according to a second embodiment of the invention will be described with reference to FIG. 12. In this embodiment, the same reference numerals are assigned to components or portions having substantially the same constructions and effects as those of the vehicle seat 1 of the first embodiment, and these components or portions will not be described, whereas components or portions different from those of the first embodiment will be described in detail. In this embodiment, the kicked portion 11A of the operating link 11 is formed in a fork-like shape, namely, is bifurcated into a front portion 11A1 and a rear portion 11A2. On the other hand, the bracket 12 has a pressed portion 12F formed in its plate portion that extends outwardly of the seat. The bracket 12 is engaged with the operating link 11 such that the pressed portion 12F is sandwiched at its front and rear sides between the front portion 11A1 and rear portion 11A2 of the operating link 11. Thus, the bracket 12 and the operating link 11 are engaged with each other such that the operating link 11 sandwiches the bracket 12 in its rotational directions, so that the bracket 12 abuts on the operating link 11 no matter which direction in which the bracket 12 rotates. It is thus possible to rotate the operating link 11 in accordance with the rotational movement of the seat back 2, without increasing the number of components.

While the first and second embodiments of the invention have been described above, the invention may be embodied in various forms other than those of the above-described embodiments. In the first embodiment, the tension spring 13 is engaged between the bracket 12 and the operating link 11 so as to suppress rattling by filling a clearance between mating faces thereof. However, another type of spring may be employed, in place of the tension spring. Also, a shock-absorbing rubber may be interposed between the bracket 12 and the operating link 11, so as to suppress rattling, or reduce or avoid abnormal noise due to rattling.

While the seat cushion 3 is indicated as an example of arrangement corresponding to the "base" of the invention, to which the seat back 2 and the operating link 11 are rotatably coupled and mounted, in each of the illustrated embodiments, the "base" of the invention may not particularly be the seat cushion, provided that it is provided on the floor. While the operating mechanism 20 in the form of a rotational link mechanism is indicated as an example of the "operating mechanism" that is operated when the operating link 11 is pushed and rotated, in each of the illustrated embodiments, the "operating mechanism" of the invention may be selected from various operating mechanisms, such as a slide link mechanism that is operated to slide when the operating link is pushed and rotated, a cable mechanism in which a cable is pulled when the operating link is pushed and rotated, and a gear mechanism that meshes with a tooth face formed on an outer circumferential surface of the operating link, and is adapted to be rotated when the operating link is pushed and rotated.

In the illustrated embodiments, torsion springs are used as the pressing spring 24 for urging the intermediate link 22 to rotate in such a direction as to be pressed against the support shaft 21A, and the holding spring 23 for holding the output link 21 in the initial position before it is operated, other types of springs, such as a tension spring, may also be used.

What is claimed is:

1. A vehicle seat provided in a condition in which a seat back is pivotally mounted to a base on a floor, such that the seat back can be inhibited from rotating, comprising:
    an operating link rotatably mounted to the base;
    a bracket that is provided on the seat back, and is arranged to be pressed against the operating link due to rotation of the seat back, so as to push and rotate the operating link; and
    an operating mechanism arranged to be operated by the operating link when the operating link is pushed and rotated,
    wherein the bracket and the operating link are engaged with each other such that one of the bracket and the operating link sandwiches the other of the bracket and the operating link in rotational directions thereof, so that said one of the bracket and the operating link abuts on the other of the bracket and the operating link in both of the rotational directions.

2. The vehicle seat according to claim 1, wherein
    the operating mechanism is held in an initial position due to spring force, before the operating mechanism is pushed and rotated by the operating link, and is arranged to be pushed and rotated by the operating link against the spring force, so as to be held in an operated condition in which the operating mechanism rides on an outer circumferential surface of the operating link.

3. The vehicle seat according to claim 2, wherein the operating mechanism has:
    an output link rotatably mounted to the base via a support shaft;
    an intermediate link rotatably mounted to the output link via a coupling shaft;
    a pressing spring that urges the intermediate link to rotate in such a direction as to press the intermediate link against the support shaft; and
    a holding spring that holds the output link in a condition in which the output link is at an initial position before operation thereof, wherein
    the intermediate link is held in a condition in which the intermediate link is pressed against the support shaft due to spring force of the pressing spring, the intermediate link being arranged to be pushed and rotated in such a direction as to be pressed against the support shaft when the operating link is pushed and rotated, so that the intermediate link is rotated about the support shaft, integrally with the output link coupled to the intermediate link via the coupling shaft, and
    when the operating link is rotated in a reverse direction from a condition in which the operating link rotates beyond a region in which the operating link pushes and rotates the intermediate link and a positional relationship between the operating link and the intermediate link is reversed, the intermediate link is pushed and rotated alone about the coupling shaft, against spring force of the pressing spring, so as to interrupt power transmission from the operating link by free rotation, thereby to inhibit the output link from rotating.

4. The vehicle seat according to claim 1, wherein the base comprises a seat cushion.

5. The vehicle seat according to claim 1, wherein the operating link includes a kicked portion that extends through a recessed portion of the bracket such that the kicked portion abuts a front portion and a rear portion of the bracket.

* * * * *